May 31, 1932.   C. E. WYRICK   1,860,762

UNIVERSAL JOINT DRIVE CONNECTION

Filed Nov. 2, 1928   2 Sheets-Sheet 1

Clayton E. Wyrick
INVENTOR

BY  J. E. Thomas
ATTORNEY

May 31, 1932. C. E. WYRICK 1,860,762
UNIVERSAL JOINT DRIVE CONNECTION
Filed Nov. 2, 1928  2 Sheets-Sheet 2

Clayton E. Wyrick
INVENTOR

BY
ATTORNEY

Patented May 31, 1932

1,860,762

UNITED STATES PATENT OFFICE

CLAYTON E. WYRICK, OF DETROIT, MICHIGAN, ASSIGNOR TO GAIRING TOOL COMPANY, OF DETROIT, MICHIGAN, A CORPORATION OF MICHIGAN

UNIVERSAL JOINT DRIVE CONNECTION

Application filed November 2, 1928. Serial No. 316,718.

This invention relates to a universal joint drive connection particularly adapted to tool holders, as shown in the accompanying drawings and described in the following specification and claims.

One object of the present invention is to meet the demand for a tool holder having a full floating action and one of the features of this invention is to provide a holder that will permit the tool to align with the bushing or work regardless of whether the machine spindle or turret tool holders are off center, or are not at right angles to each other, caused by the employment of a faulty jig, or by wear, or other irregularities.

Another feature of construction is the provision of a double universal joint drive means between a driving and a driven member.

A further feature of the invention consists in a construction whereby a tool socket may shift laterally in a holder within pre-determined limits and be rotated either parallel with the axis of a machine tool holder or around its own axis independently of the axis of the tool holder.

It will be noted that the universal joint action is equal to two universal joints and further that the invention is not confined to tool holders but may be used as a shaft coupling as shown more particularly in the drawings.

With the foregoing and other objects in view which will appear as the description proceeds, the invention further resides in the combination and arrangement of parts and in the details of construction hereinafter described and claimed, it being understood that changes may be made in the precise embodiment of the invention shown without departing from the spirit of the same.

In the drawings accompanying this specification:

Referring to the letters of reference placed upon the drawings:

A denotes a tapered shank holder having a driving socket $A^1$ of internal polygonal form in cross-section, with an outwardly projecting flange $A^2$ at the outer end of the socket portion.

B indicates a rotatable screw threaded collar loosely sleeved upon the socket $A^1$, and C is a spring coiled upon the latter bearing at one end against the flange $A^2$ and at the other end against the inwardly directed flange $B^1$ of the collar.

D designates a tool socket with an outwardly projecting screw threaded flange $D^1$ engaged by the collar B,—connecting the parts together.

E denotes a coupling driving shaft formed at each end with an arc-shaped hexagonal driving head $E^1$ adapted to respectively engage the hexagonal walls of the driving socket $A^1$ at the end of the tapered shank of the tool holder, and also the walls of a socket $D^2$ of like form in the upper end of the tool socket D, thereby providing a double universal driving connection between the shank A and the tool socket D of the holder.

The respective sides of the hexagonal driving heads $E^1$, $E^1$ of the shaft E are arc-shaped in longitudinal section, and merge into an arc-shaped end $E^2$, to admit of a universal rocking movement between the tapering shank and the tool socket within pre-determined limits, governed by the size of the opening provided in the collar B, in relation to the outer diameter of the socket at the end of the shank.

F denotes a removable thrust bearing or ball race which may be employed or not as required, located between the end wall of the driving socket of the tapering shank and the end wall of the tool socket of the holder.

Figures 1, 2:
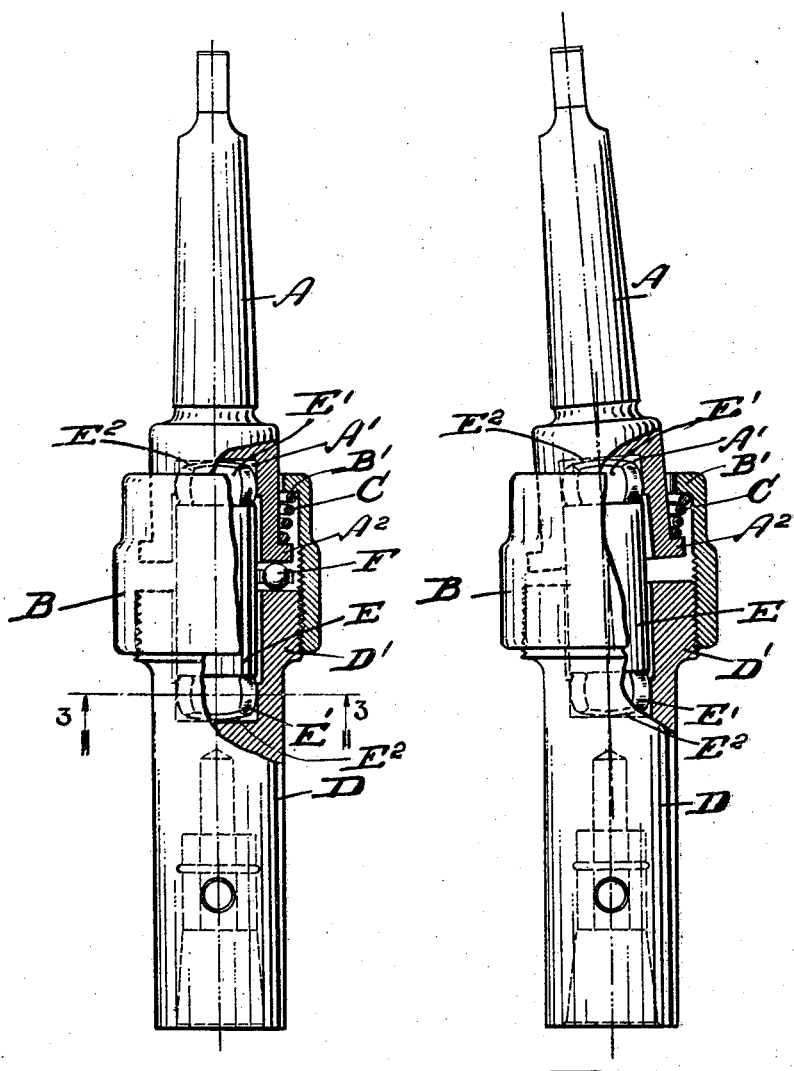
Figure 1 is an elevation of the tool holder with parts broken away showing a thrust bearing inserted between the socket and shank of the tool holder to provide a "parallel float."
Figure 2 is a similiar view with the ball race removed to permit an "angular float."
Figure 3:
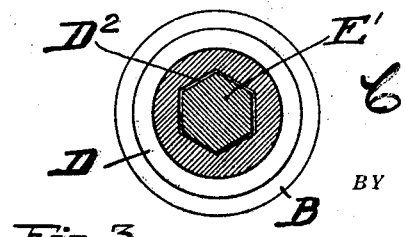
Figure 3 is a cross-sectional view taken on or about line 3—3 of Figure 1 through one end of the universal driving connection between the socket and shank of the holder.
Figure 4:
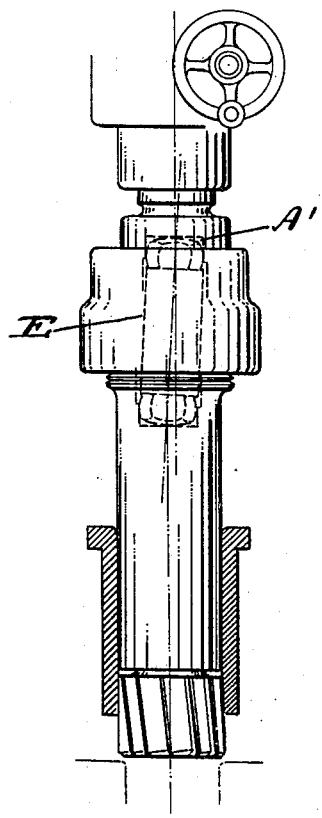
Figure 4 is a view in elevation showing a tool holder adapted to a spindle and illustrates how the universal action compensates for misalignment.
Figure 5:
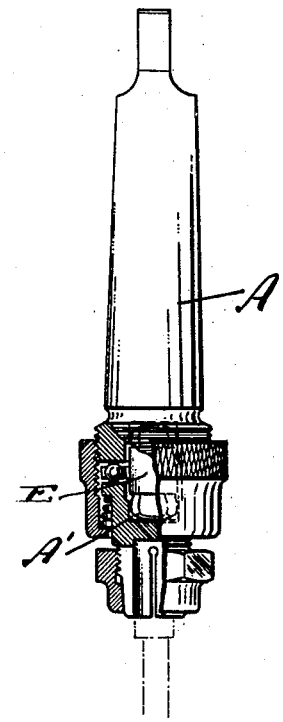
Figure 5 illustrates a tap or reamer holder embodying the universal joint action.
Figure 6:
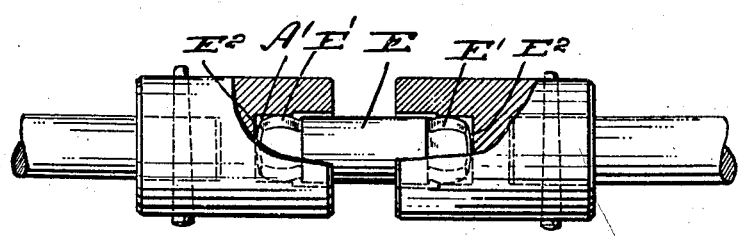
Figure 6 is a fragmentary detail with parts in section showing the coupling driving shaft with its arc-shaped polygonal driving head at each end engaged with the polygonal walls of a socket at the end of a pair of opposing shafts, as a driving coupling means between the shafts.

When the thrust bearing F is employed a parallel floating action will obtain in relation to the respective axes of the tapering shank and the tool socket of the holder—see Figure 1—in contradistinction to an angular floating relation obtained between the parts upon the removal of the thrust bearing—as indicated in Figure 2 of the drawings.

The simplicity of the device is evident, its ruggedness is positive, and as a result of the double action drive which serves as a double universal joint, the tool is permitted to follow through holes on a true line regardless of the load.

Having thus described my invention what I claim is:

1. In an article of the class described, a shank provided at one end with a driving socket of internal polygonal form in cross-section; a rotatable screw threaded collar loosely sleeved upon the wall of the socket; a tool supporting member having a driving socket at one end of internal polygonal form in cross-section with a screw threaded flange adapted for connection with the screw threaded collar; a drive coupling shaft having at each end a polygonal-shaped driving head respectively seated in the polygonal-shaped driving sockets of the shank and tool supporting members; and a cone-shaped spring located between the socket wall of the shank and the wall of the collar bearing at one end against the shoulder formed by the outwardly directed flange of the socket portion and at the other end against the shoulder formed by the inwardly directed flange of the collar, whereby spring slippage resulting from shifting of the shank socket in relation to the tool supporting member is eliminated.

2. In an article of the class described, a shank provided at one end with a driving socket of internal polygonal form in cross-section; a rotatable screw threaded collar loosely sleeved upon the wall of the socket; a tool supporting member having a driving socket at one end of internal polygonal form in cross-section with a screw threaded flange adapted for connection with the screw threaded collar; a drive coupling shaft having at each end a polygonal-shaped driving head respectively seated in the polygonal shaped driving sockets of the shank and tool supporting members; a ball thrust bearing located between the socket end of the shank and the opposing end of the tool supporting member; and a cone-shaped spring located between the socket wall of the shank and the wall of the collar bearing at one end against the shoulder formed by the outwardly directed flange of the socket portion and at the other end against the shoulder formed by the inwardly directed flange of the collar, whereby spring slippage resulting from shifting of the shank socket in relation to the tool supporting member is eliminated.

3. In an article of the class described, a pair of polygonal socket members; a shaft having arc-shaped polygonal heads at each end adapted to engage said sockets; a cone-shaped resilient member surrounding one of the socket members restrained from movement at one end by a shoulder of the socket member; a housing provided with a shoulder engaging the opposite end of said resilient member, said housing being provided with means for adjustable connecting with the second socket member for the purpose of resiliently coupling said socket members and for adjusting to the desired resiliency of universal action between the socket members.

In testimony whereof I sign this specification.

CLAYTON E. WYRICK.